Sept. 1, 1925. 1,552,391
C. A. CAMPBELL
ENGINEER'S BRAKE VALVE
Filed March 10, 1925 2 Sheets-Sheet 2
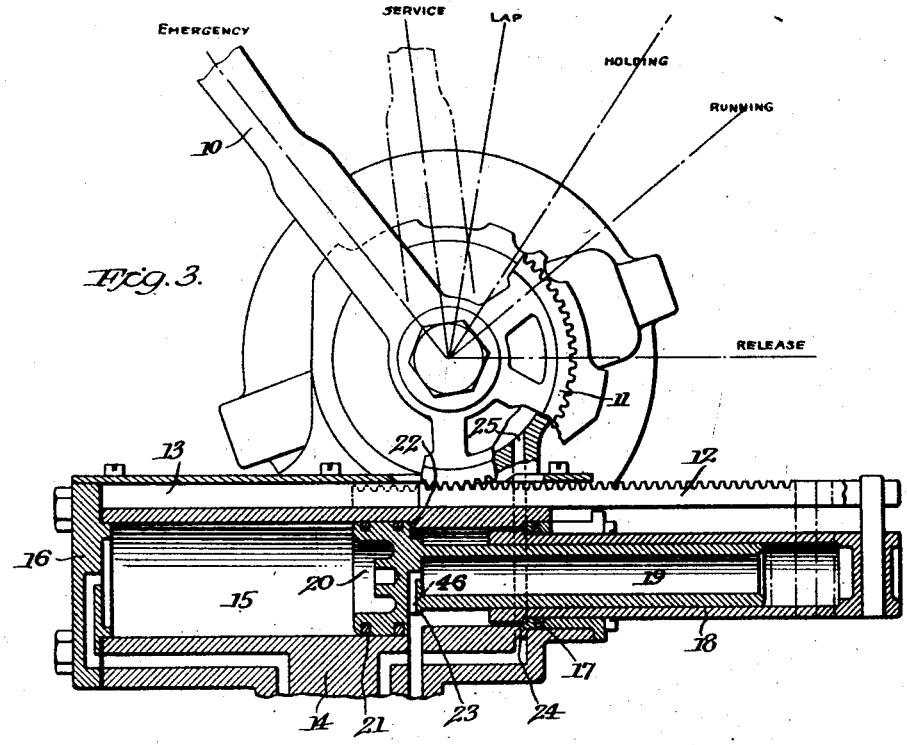
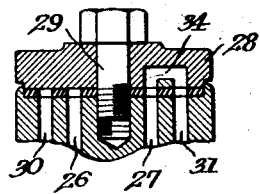 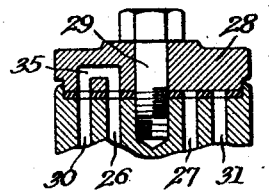
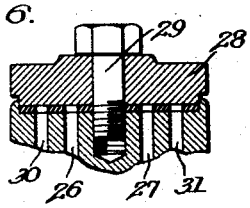
Inventor
Charles Albert Campbell
by Dodge and Sons
Attorneys Patented Sept. 1, 1925.

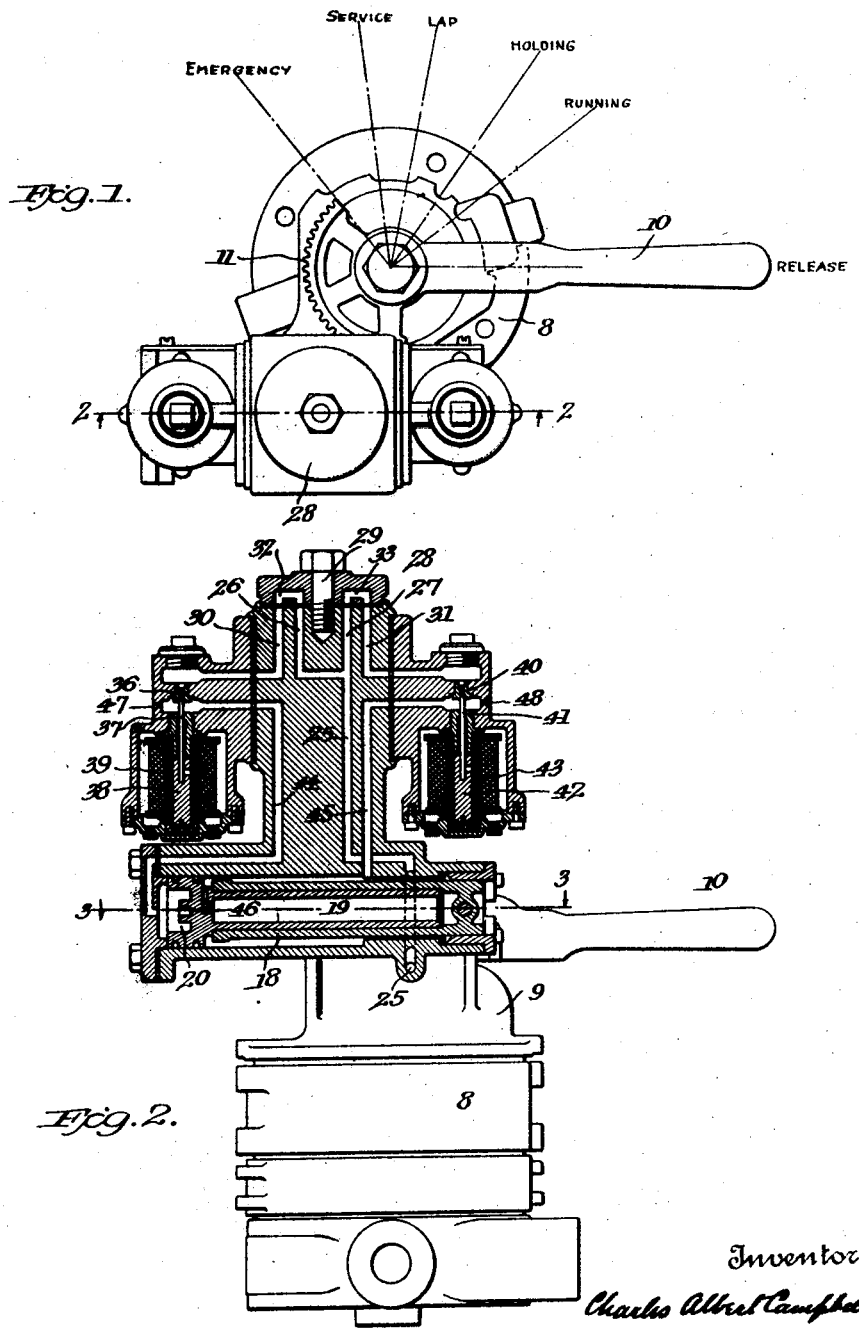

1,552,391

UNITED STATES PATENT OFFICE.

CHARLES ALBERT CAMPBELL, OF WATERTOWN, NEW YORK, ASSIGNOR TO THE NEW YORK AIR BRAKE COMPANY, A CORPORATION OF NEW JERSEY.

ENGINEER'S BRAKE VALVE.

Application filed March 10, 1925. Serial No. 14,511.

*To all whom it may concern:*

Be it known that I, CHARLES ALBERT CAMPBELL, a citizen of the United States, residing at Watertown, in the county of Jefferson and State of New York, have invented certain new and useful Improvements in Engineers' Brake Valves, of which the following is a specification.

This invention relates to air brakes and particularly to an engineer's brake valve in combination with a motor mechanism for actuating the valve to produce both service applications and emergency applications and controllable by various types of automatic train control mechanisms.

Devices have heretofore been used to produce emergency applications by moving the engineer's brake valve to emergency position. This was found undesirable in many cases and an improved mechanism was provided to move the engineer's brake valve automatically to service position and then leave it free to be moved manually to emergency position, if occasion required.

The above devices do not meet all the requirements of certain modern train control systems. There are, for example, automatic systems which require the production of either a service or an emergency application according to the conditions, and under certain circumstances it is necessary to make an automatic emergency application shortly after the making of an automatic service application. It is desirable for many reasons that these functions be brought about through a manipulation of the engineer's brake valve, and the present invention provides a motor device which will accomplish the above results in a simple and efficient manner by an actuation of the engineer's brake valve and which nevertheless leaves this valve entirely free for manual actuation under normal conditions.

Another important feature of the invention is the provision of means for cutting out the emergency shifting function or the service shifting function singly, so that if only one part of the system becomes deranged, the other may be left operative. This is an important feature, for in many train control systems the caution mechanism, which produces a service application, is more or less distinct from the danger or stop mechanism, which produces an emergency application. It is an important practical feature, therefore, to be able to continue one part of the mechanism in action, even though the other is necessarily cut out because of some derangement. This function is accomplished by a simple rotary valve which may be set to cut off the motive fluid from the emergency valve-shifting motor, or from the service valve-shifting motor, or from both.

The preferred embodiment of the invention is illustrated in the accompanying drawings, in which—

Fig. 1 is a plan view of the engineer's brake valve with the motor applied;

Fig. 2 is a vertical section on the line 2—2 of Fig. 1;

Fig. 3 is a horizontal section on the line 3—3 of Fig. 2; and

Figs. 4, 5 and 6 are fragmentary views of a portion of Fig. 2 on an enlarged scale showing different positions of the cut out valve.

The engineer's brake valve is indicated generally by the numeral 8 applied to its casing, and is of the usual equalizing discharge type in which the functions of the valve are controlled by the position of the so-called rotary valve subject on its top to main reservoir pressure. Accordingly there is within the cap 9 of the valve casing air under main reservoir pressure. The valve handle 10 may be manually set in any of six positions, known as release, running, holding, lap, service, and emergency, to perform the functions characteristic of these positions and familiar to those skilled in the art. This type of engineer's brake valve is chosen for illustration merely because it is the one now in most common use on railway trains, but the invention may be used with any type having distinct service and emergency positions.

Formed integrally with the handle 10 is a gear sector 11 through which the handle 10 may be actuated by the movements of a rack 12 which meshes with the sector 11 and which is guided in a guideway 13 in a casting indicated generally by the numeral 14, the casting 14 being formed with various ports, passages, valve chambers and cylinder space, as hereinafter more fully described.

Formed in the casting 14 with its axis parallel with the guideway 13 is a cylinder 15 closed at one end by a removable head 16 and having at its opposite end a packed joint 17 through which a tubular piston rod 18 connected with the rack 12 may slide. The tubular piston rod 18 telescopes over a tubular stem 19 formed on a piston head 20 which in turn works in the cylinder space 15. Leakage past the piston 20 is prevented by the packing rings 21 of usual form, and the movement of the piston to the right (as viewed in the drawings) is limited by a shoulder 22. The inward movement of the tubular piston rod 18 relatively to the piston rod 19 is limited by shoulder 23, while the outward movement of the tubular piston rod 18 is limited by the collision of the shoulder 24 formed therein with the inner side of the packing 17. The shoulders are so located and the parts are so dimensioned that in limiting positions of the piston 20 and the rod 18, the valve handle 10 will be positioned as will be now described.

When the piston 20 and the tubular piston rod 18 are together in their extreme left-hand positions, the handle 10 is in release position. If the piston 20 be moved to the right until it is arrested by the shoulder 22, the tubular piston rod 18 remaining in contact with the shoulder 23, the handle 10 will be moved to service application position. If, however, the sleeve 18 be moved outward until its outward movement is limited by the collision of the shoulder 24 with the packing 17, the handle 10 will be in emergency position. As will be explained, the tubular piston rod 18 may be made to assume this last-named outermost position regardless of the position of the piston 20.

A port 25 leads from the space above the rotary valve and terminates in two branches 26 and 27 on the seat of a rotary disc valve 28 held in place by a machine screw 29. Adjacent the ports 26 and 27 are two related ports 30 and 31, and the valve 28 is provided with loop ports which may be set to establish connections from the port 26 to the port 30 and from the port 27 to the port 31 in various relations. For example, in Fig. 2 both connections are established simultaneously by two loop ports 32 and 33. In Fig. 4, which shows another position of the valve 28, a loop port 34 connects the ports 27 and 31, and the ports 26 and 30 are disconnected. In Fig. 5, which shows another position of the valve 28, the loop port 35 connects the ports 26 and 30, the ports 27 and 31 being disconnected. In Fig. 6, which shows a fourth position of the valve 28, both the connections above referred to are cut off.

The port 30 leads to a valve seat 36 controlled by a needle valve 37 which is actuated by an armature 38 normally urged upward as a result of the excitation of the electric winding 39. The excitation of this winding 39 is controlled by the caution mechanism forming part of any suitable train control system. Many such are known and specific illustration is therefore deemed unnecessary. The port 31 leads to a valve seat 40 controlled by a needle valve 41 which is actuated by an armature 42. Under normal conditions the armature 42 is urged in valve-closing direction as a result of the excitation of the windings 43. The windings 43 are under the control of the danger or stop mechanism forming part of any suitable train control mechanism.

When open, the valve 37 permits main reservoir air to flow by way of the port 44 to the space within the cylinder 15 at the left of the piston 20. Consequently, when the valve 28 is in the position shown in Fig. 2, the de-energization of winding 39 as a result of a caution indication by the train control mechanism opens valve 37 and admits air under pressure to move the piston 20 to the right until such movement is arrested by the shoulder 22. As explained, this will move the valve handle 10 to service application position.

The valve 41 controls flow through a port 45 to the space around the telescoping stems 18 and 19 within the cylinder 15. This annular space is connected by a port 46 with the interior of the stem 19 and tubular piston rod 18, so that the tubular rod 18 acts itself as a piston having an effective diameter equal to the outside diameter of this tubular rod. The winding 43 will be de-energized by any danger or stop indication of the automatic control mechanism, and when de-energized, will allow the valve 41 to open. This admits main reservoir air to the annular space to the right of piston 20 within cylinder 15 and causes the tubular piston rod 18 to move to its extreme right-hand position, regardless of the position of the piston 20 at the time such motion starts. Thus, if winding 39 be de-energized after winding 43 is de-energized, the valve handle 10 will be moved first to service position, and then to emergency position, with such interval between its two movements as there is between the de-energization of the two windings specified. On the other hand, if the winding 43 is de-energized while the winding 39 remains energized, the valve handle 10 will be moved without interruption from whatever position it may be in at the time of such energization to emergency position.

The ports 40 and 45 are both bled through small bleed ports 47 and 48 whose capacity is much smaller than the capacity of the ports in valve seats 36 and 40. It follows that while the valves 37 and 41 are open, the ports 47 and 48 are respectively without effect; but as soon as valves 37 and 41 are closed, the ports 47 and 48 act to bleed away the pressure in cylinder 15 to the right and to the left of the piston 20 respectively. Consequently, under normal conditions the engineer is free to move the handle 10 at will without material restraint by the motor.

It will be obvious that with the valve in the position shown in Fig. 4, it is impossible for the motor to make an automatic service application, the emergency application function being effective. In Fig. 5 the reverse condition obtains, the service function being active and the emergency function inactive. In Fig. 6 both functions are suspended. This is a useful feature because if either the caution or the stop element of the train control device become deranged, it is possible to shut it down and yet leave the other element in action. The operation of the device will be clear from the explanation above given.

Obviously various modifications may be made without departing from the spirit of the invention and therefore no limitation to the specific structure is implied beyond what is specified in the following claims.

What is claimed is:

1. The combination of an engineer's brake valve having a service application position and an emergency application position; a motor device having two power actuated shifting elements operatively connected with said brake valve, one arranged to move said valve to the first-named position and the other arranged to move said valve to the second-named position; and means constructed and arranged to apply power to said elements selectively.

2. The combination of an engineer's brake valve having a service application position and an emergency application position; a motor device having two power actuated shifting elements, one element arranged to actuate said valve directly and move it to the second-named position, and the second element having a smaller range of motion and arranged to actuate said valve through the first element to move it to the first-named position; and means constructed and arranged to apply power to said elements selectively.

3. The combination of an engineer's brake valve having a service application position and an emergency application position; a pressure motor device having two pistons operatively connected with said brake valve, one arranged to move said valve to the first-named position and the other arranged to move said valve to the second-named position; and means constructed and arranged to cause pressure fluid to actuate said pistons selectively.

4. The combination of an engineer's brake valve having a service application position and an emergency application position; a pressure motor device having two pistons, one piston arranged to actuate said valve directly and move it to the second-named position, and the second piston having a smaller range of motion and arranged to actuate said valve through the first piston to move it to the first-named position; and means constructed and arranged to cause pressure fluid to actuate said pistons selectively.

5. The combination of an engineer's brake valve having a service application position and an emergency application position; a pressure motor having two pistons, one having a larger range of motion than the other and connected to actuate said valve directly to shift the valve to emergency position, and the second arranged to engage and move the first through the smaller range of motion characteristic of the second to move the valve to service application position; and means constructed and arranged to admit pressure fluid between the pistons and behind the second piston selectively.

6. The combination of an engineer's brake valve having a service application position and an emergency application position; a pressure motor having two pistons in telescoping relation with each other, one connected with said valve and movable to shift the same to emergency application position and the second arranged to engage the first and move it through a portion of its full range sufficient to move the valve to service application position; and means constructed and arranged to admit pressure fluid between the pistons and behind said second piston selectively.

7. The combination of an engineer's brake valve having a service application position and an emergency application position; a pressure motor device having two pistons operatively connected with said brake valve, one arranged to move said valve to the first-named position and the other arranged to move said valve to the second-named position; means constructed and arranged to cause pressure fluid to actuate said pistons selectively; and a single valve adjustable to various different positions in which either and both pistons are rendered operative and inoperative as desired.

8. The combination of an engineer's brake valve having a service application position and an emergency application position; a pressure motor device having two pistons, one piston arranged to actuate said valve directly and move it to the second-named position, and the second piston having a smaller range of motion and arranged to actuate said valve through the first piston to move it to the first-named position; means constructed and arranged to cause pressure fluid to actuate said pistons selectively; and a single valve adjustable to various different positions to permit and prevent the flow of pressure fluid to either and to both pistons as desired.

In testimony whereof I have signed my name to this specification.

CHARLES ALBERT CAMPBELL.